May 8, 1962 R. W. WINBERG 3,033,735
BELT FORMING MACHINE
Filed Nov. 4, 1959 4 Sheets-Sheet 1

FIG. 1.

INVENTOR.
RAGNAR W. WINBERG
BY Amster + Levy
ATTORNEYS

May 8, 1962

R. W. WINBERG 3,033,735

BELT FORMING MACHINE

Filed Nov. 4, 1959

INVENTOR.
RAGNAR W. WINBERG
BY Ameter + Levy
ATTORNEYS

May 8, 1962  R. W. WINBERG  3,033,735
BELT FORMING MACHINE
Filed Nov. 4, 1959  4 Sheets-Sheet 4

INVENTOR.
RAGNAR W. WINBERG
BY Ameter + Levy
ATTORNEYS 3,033,735
Patented May 8, 1962

3,033,735
BELT FORMING MACHINE
Ragnar W. Winberg, 115 W. Elder Ave.,
Floral Park, N.Y.
Filed Nov. 4, 1959, Ser. No. 850,796
13 Claims. (Cl. 156—352)

The present invention relates to belts of the type used on ladies' dresses, for example, and in particular the present invention relates to the manufacture of such belts.

During the manufacture of belts of this type it is necessary to stitch a belt facing to a belt backing. Because of the difficulties involved in properly aligning the facing and backing with each other during the stitching thereof, they are adhesively joined to each other prior to the stitching, and the present invention deals in particular with a machine which serves to adhesively join these backings and facings to each other. In particular, the present invention deals with a machine which will join to a continuous backing a series of belt facings in substantially end to end relation.

One of the objects of the present invention is to provide a machine of this type which will guarantee, irrespective of the manipulations made by the operator, that the successive belt facings which are arranged along the continuous backing are spaced relatively close to each other so that a minimum amount of belt backing will be wasted when the facings and the portion of the backing joined thereto are separated from each other.

Another object of the present invention is to provide a machine which requires only a single endless conveyor band and which includes a minimum amount of electrical structure for providing automatic controls.

Up to the present time, the adhesive joining of belt backings and facings to each other has not been very reliable because of the fact that they are joined together with a relatively small amount of adhesive extending substantially along a pair of lines. It is accordingly a further object of the invention to provide, in a machine of this type, an adhesive applying structure which will guarantee the spreading of adhesive over an area sufficiently large to reliably hold the backing and facing together not only along most of their length but also and especially at a pointed end of the facing where it is particularly important to have a secure connection to facilitate proper stitching.

It is a still further object of the invention to provide a machine composed of simple, ruggedly constructed elements which are very reliable in operation, which will have a long life, and which will require a minimum amount of maintenance and repair.

A primary feature of the machine of the invention resides in an automatic control structure of extreme simplicity which will reliably stop the transporting of a continuous backing when a facing joined thereto has its trailing end located only slightly beyond the point of application of the leading end of the facing to the path of movement of the backing so that when the leading end of the next facing is applied at this point there will be a relatively short distance between the trailing end of the first facing and the leading end of the next facing. Thus, a minimum amount of backing waste is guaranteed.

In addition, the invention includes important features among which are an adhesive applying means which can apply adhesive over substantially the entire width of the backing, a transporting structure which includes only one endless conveyor band, band tensioning and guiding structure which guarantees that a hot presser iron will engage the band only during actual transportation of the backing and maintains the conveyor band and presser iron spaced from each other at all other times, and a structure which enables the leading end of a facing to be applied into the nip between a backing and the conveyor band without any danger of injury to the backing or to the conveyor band.

The invention is illustrated, by way of example, in the accompanying drawings which form part of this application, and in which.

Figure 1:
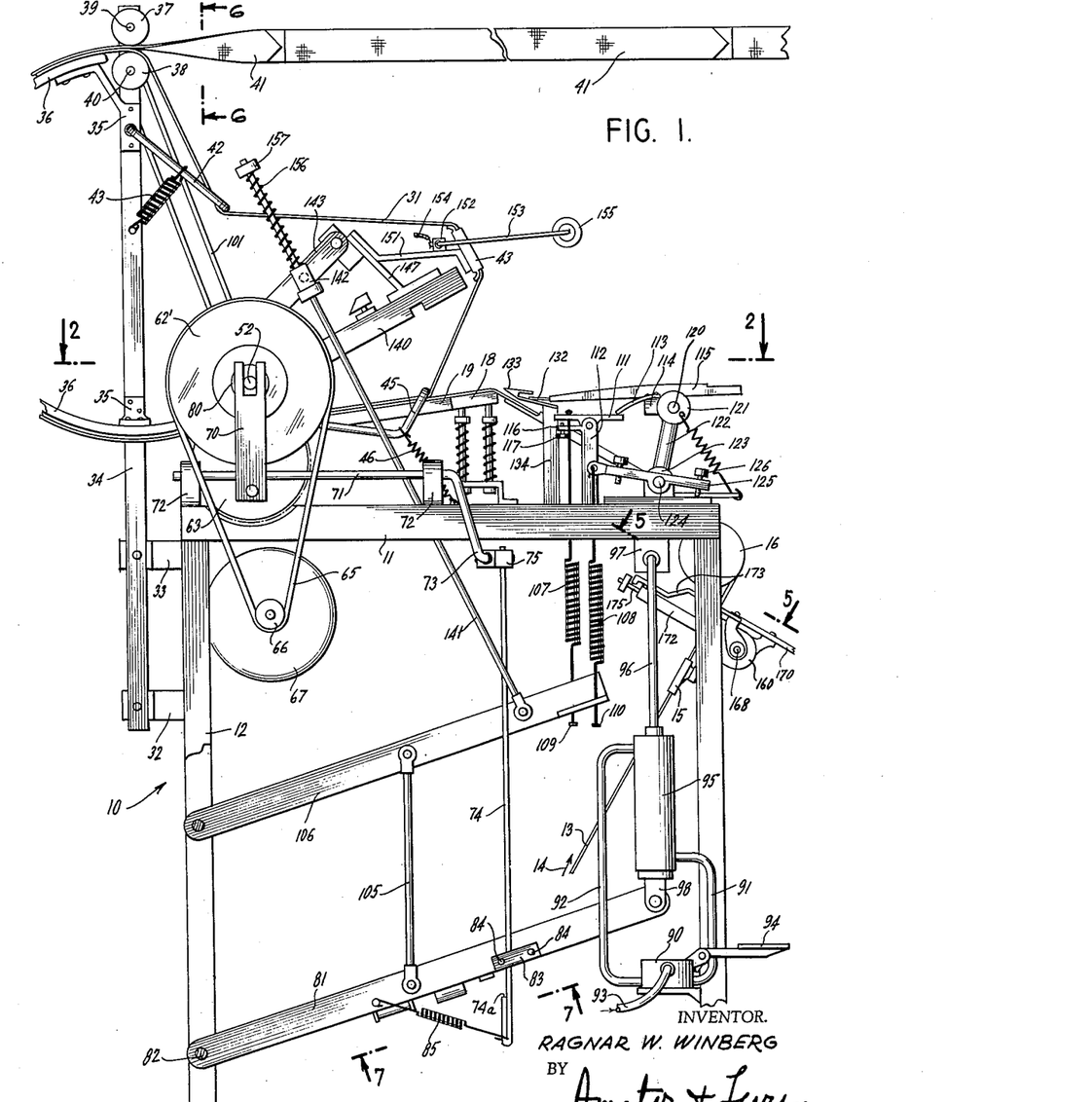
FIG. 1 is a side elevational view of a machine constructed according to the present invention.

Referring now to the drawings and to FIG. 1 in particular, the structure of the invention includes a supporting framework 10 which forms a support means supporting all of the structure of the invention. This framework 10 includes a base plate 11 supported at table height by a plurality of legs 12.

This framework 10 carries a transporting means which transports a continuous backing 13 from any suitable supply roll (not shown) along a predetermined path determined by the several guides described below. The backing moves upwardly toward the front or right end of the base plate 11, in the direction of the arrow 14 shown in FIG. 1. The backing 13 is guided by a channel-shaped guide member 15 from which the backing moves upwardly around a guide roller 16 turnably carried by the supporting framework 10. After moving around the guide roller 16 (FIG. 3) the band moves along a guide 17 and then along rigid members 18 and 19.

Figure 3:
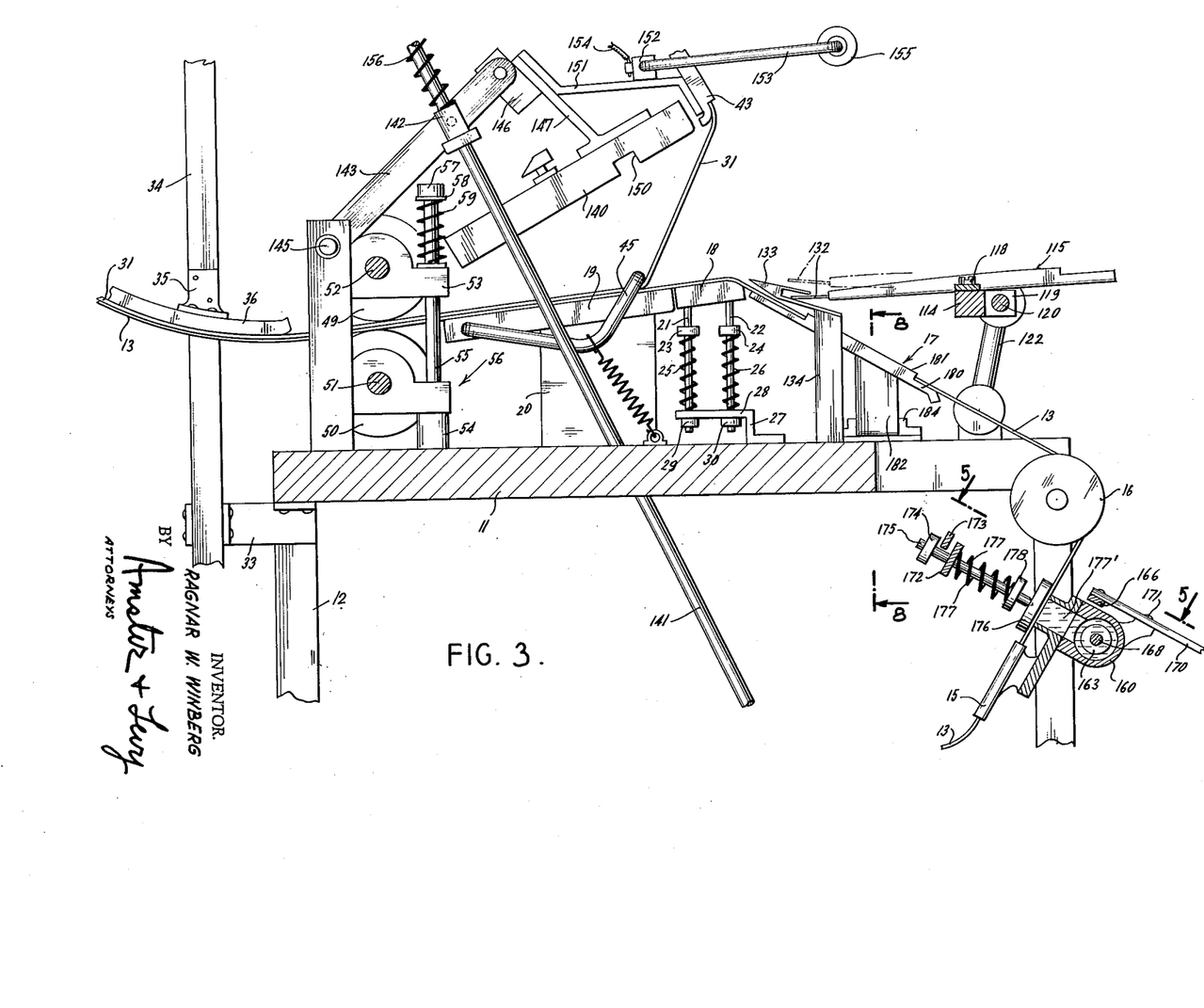
FIG. 3 is a fragmentary side section taken along the lines 3—3 of FIG. 2 in the direction of the arrows.

These rigid members 18 and 19 form part of the transporting means of the invention. The elongated rigid member 19 is fixedly carried by a bracket 20 which is fixed directly to the plate 11. The rigid member 18, which is located in advance of the member 19 and forms a continuation thereof in the position of the rigid members illustrated in FIGS. 1 and 3, is carried by a pair of rods 21 and 22 which are fixed to the underside of the member 18. These rods fixedly carry collars 23 and 24 which abut against the top ends of springs 25 and 26 respectively coiled around the rods 21 and 22. The rods 21 and 22 extend with considerable clearance through a pair of holes formed in a bracket 27 which is fixed to the upper surface of the base plate 11, as illustrated in FIG. 3; and at their end portions which are located below the wall 28 of the bracket 27, the rods 21 and 22 fixedly carry collars 29 and 30, respectively, so that these collars 29 and 30 limit the upward movement of the rods 21 and 22 and thus determine the elevation of the rigid member 18. The collars 29 and 30 are adjustable along the rods 21 and 22 so that the latter can be set so as to accurately position member 18 to guarantee that it forms an extension of the member 19. The upper faces of members 18 and 19 form a surface of rigid means 18, 19 engaged by the backing 13, and the upper face of member 18 forms an entrance portion of the surface of rigid means 18, 19. The several collars 23, 24, 29 and 30 are adjustably fixed to the rods by suitable set screws so that in this way the force of the springs 25 and 26 can be regulated and the position of the block 18 can be regulated. The parts 21—36 form a resilient means yieldably holding member 18 at the path along which backing 13 moves.

Figures 5, 6, 7, 8:
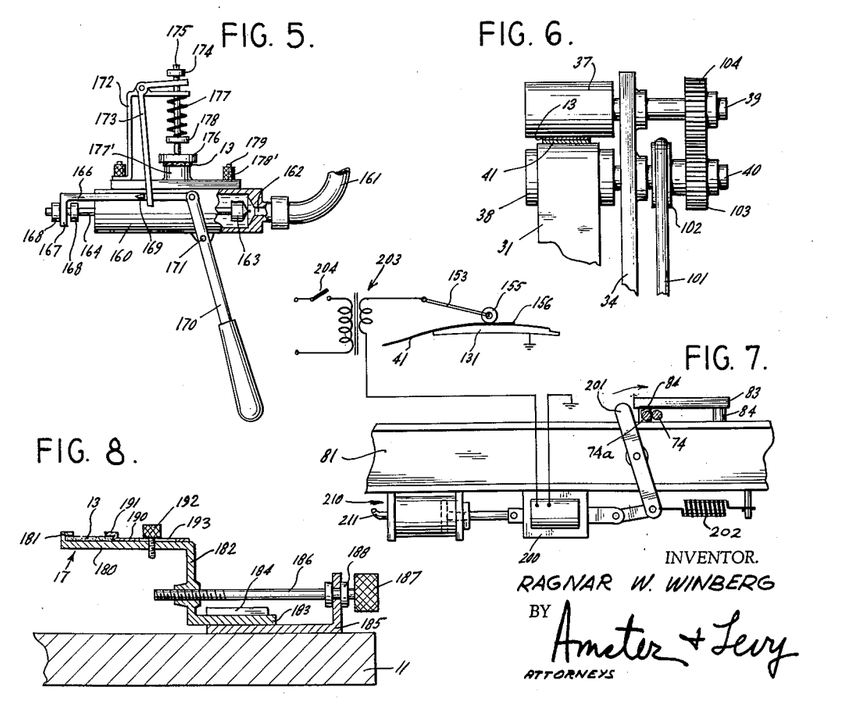
FIG. 5 is a fragmentary view taken along the lines 5—5 of FIG. 1 in the direction of the arrows and showing an adhesive applying structure of the invention.
FIG. 6 is a fragmentary view taken along line 6—6 of FIG. 1 and showing part of the transporting means of the machine of the invention.
FIG. 7 is a fragmentary view taken along line 7—7 of FIG. 1 in the direction of the arrows and showing the electrical control structure of the invention.
FIG. 8 is a view taken along line 8—8 of FIG. 3 in the direction of the arrows and illustrating the backing guide structure.

In accordance with the present invention the transporting means includes only a single endless conveyor band 31 made of any suitable material, such as fiberglass which is capable of withstanding relatively high temperatures and is also a good conductor of heat. A rear leg 12 of the support means 10 (FIG. 1) is connected to a pair of brackets 32 and 33 which carry an upstanding bar 34, and this bar 34 in turn carries brackets 35 which in turn are connected as by rivets, screws, or the like, to a curved guide bar 36 extending substantially along an arc of a circle in the manner most clearly shown in FIG. 1. The endless conveyor band 31 is guided around and engages the curved stationary bar 36. The curved guide bar 36 serves to clamp each and every belt, no matter how long or short, between it and the endless conveyor band 31 for the period in which the next following belt runs through the machine. This prolongs the clamping action on the belts and assures better adhesion. From the top end of the bar 36 the conveyor band moves between a pair of rolls 37 and 38 which are also carried by the bar 34. Thus, the latter is formed with a pair of openings through which extend a pair of shafts 39 and 40 on which the rolls 37 and 38 are respectively fixed, and these shafts are freely turnable in bearings which are carried by the bar 34 at its upper end portion. The shafts 39 and 40 are shown in FIGS. 1 and 6. The spacing between the rolls 37 and 38 is such that a backing 13 together with a facing 41 will pass between the rolls 37 and 38 while being pressed together in the space between these rolls.

The bar 34 pivotally carries slightly below the lower roll 38 a tensioning rod 42 which has at its upper end, as viewed in FIG. 1, a free end portion extending into an opening formed in the upper bracket 35 as well as the bar 34 so that in this way the tensioning rod 42 is supported for pivotal movement. A spring 43 is connected at one end to the bar 34 and at its opposite end to the tensioning rod 42 for urging the latter in a clockwise direction, as viewed in FIG. 1, and at its lower end the tensioning rod 42 has an extension extending across the upper face of the upper run of the endless conveyor band 31 so as to tension the latter in the manner illustrated most clearly in FIG. 1. This latter extension of rod 42 will also scrape away and break up any dried adhesive which happens to be on the band. The conveyor band 31 extends from the tensioning rod 42 around a band guide 43 and from the latter beneath the portion 44 (FIG. 2) of a second tensioning rod 45 which is pivotally connected at its left end as viewed in FIG. 2, to a part of the elongated rigid member 19. The tensioning rod 45 is urged in a clockwise direction, as viewed in FIG. 1, by a spring 46 connected at one end to the rod 45 and at its opposite end to the upper face of the base plate 11. Thus, the tensioning rod 45 at all times maintains the lower run of the endless conveyor band 31 next to the upper face of the rigid guide member 19.

Figure 2:
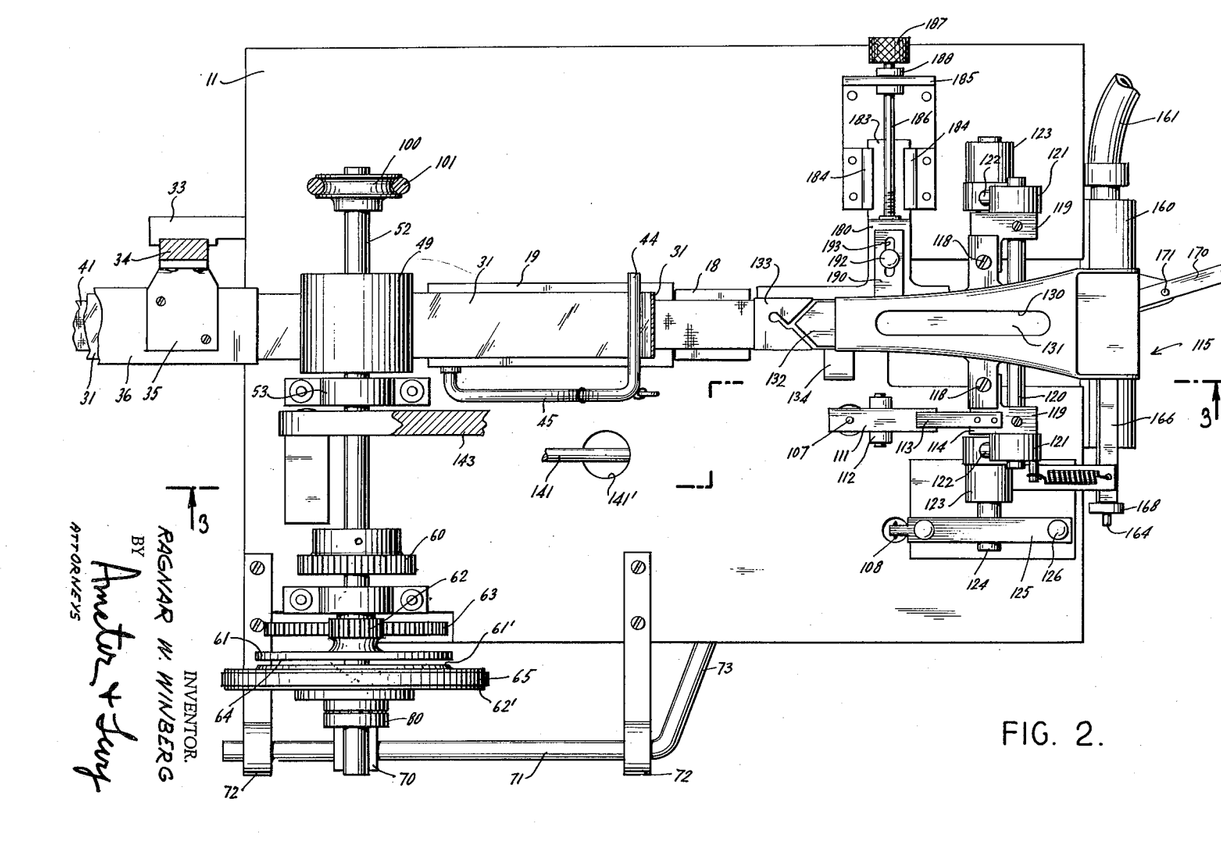
FIG. 2 is a plan view taken along the lines 2—2 of FIG. 1 in the direction of the arrows.

The conveyor band moves parallel to the upper surface of member 19 to the left, as viewed in FIGS. 1–3, into the nip between a pair of pressure rolls 49 and 50. These rolls are fixedly carried by shafts 52 and 51, respectively, which are supported in suitable bearings 53. Thus, there are upper bearings 53 supporting the upper shaft 52 for rotation about its axis together with the upper pressure roll 49, and lower bearings 53 supporting the lower shaft 51 for rotation about its axis. These lower bearings 53 rest on the lower end portions 54 of a plurality of standards 56 which have extending through aligned vertical bores of the several bearing blocks 53 elongated rod portions 55 of a smaller diameter than the lower end portions 54 of the standards 56, so that the elevation of the lower bearing blocks 53 is determined by the shoulders formed between portions 54 and 55 of the standards 56 (FIG. 3). These standards carry at their top ends nuts 57 and washers 58, and the latter bear against the upper ends of coil springs 59 respectively coiled about the several rods 56. The lower ends of the springs 59 bear against the upper blocks 53 to urge the latter downwardly along the standards 56 so that in this way the force of the several springs 59 urges the upper roll 49 downwardly toward the lower roll 50 to press the conveyor band as well as the backing and facing between these rolls as will be apparent from the description which follows.

The shafts 52 and 51 extend beyond the edge of the base plate 11, as particularly evident from FIG. 2. The upper shaft 52 fixedly carries a gear 60 which meshes with an identical gear fixed to the shaft 51 below the gear 60. Freely turnable upon the upper shaft 52 is a driven clutch member 61 (FIG. 2) to which a pinion 62 is fixed, and this pinion 62 meshes with a gear 63 which is fixed to the lower shaft 51. Thus, when the driven clutch member 61 is rotated the drive will be transmitted from the latter through the pinion 62 and gear 63 to the lower shaft 51, and then through the pair of gears 60 to the upper shaft 52, and the direction of rotation is such that the lower run of the endless conveyor band is advanced to the left, as viewed in FIGS. 1–3.

The clutch of the structure illustrated in the drawings includes a driving clutch member 62' having a clutch face 61' which can be placed in frictional driving engagement with the face 64 of the driven clutch member 61 by any suitable friction material. The movable clutch member 62' is in the form of a pulley freely turnable on the upper shaft 52 at a part of the latter extending beyond shaft 51, and member 62' is driven by a pulley belt 65. The lower end of the melt 65 extends around a pulley 66 (FIG. 1) which is fixed on the shaft of a motor 67 which is mounted on the underside of the base plate by any suitable bracket, and thus when the motor 67 is energized the driven clutch member 62' will be rotated.

A clutch shifting fork 70 has an upper bifurcated end through which the upper shaft 52 freely extends and this shifting fork 70 is fixedly carried by a rod 71 which is supported for turning movement by the brackets 72 (FIG. 1) which are carried by the base plate 11. The rod 71 has a downwardly extending crank arm 73 which is connected at its free end to the upper end of a rod 74. The upper end of this rod is fixed to a block 75 which is freely turnable on the lower end of the arm 73 but is prevented from moving axially along the arm 73 by any suitable nut or the like. The rod 74 hangs freely from the block 75 while being fixed to the latter and at its bottom end is provided with a projection 74a in the form of a free end of the rod 74 which is bent back upon itself. This rod 74 forms, as will be apparent from the description below, a rod means having a pair of longitudinal positions which determine whether or not the transporting means is operating or not.

The size and arrangement of the above-described clutch means are such that the clutch means automatically assumes a disengaged position and must be held positively in its engaged position. The linkage 70, 71, 74 is mounted on the brackets 72 in such a way and has its weight distributed in such a way that when no outside force acts on this linkage, the shifting fork 70 will assume an idle position spaced sufficiently from the driven clutch member 61 to allow the driving clutch member 62 to automatically space itself from the driven clutch member 61 simply by the tension in the belt 65 and the tendency of the clutch members 61 and 62 to move apart from each other, and the shifting fork 70 is capable of engaging a thrust bearing 80 (FIG. 2) which transmits the turning of the shifting fork toward the driven clutch member 61 to the driving clutch member 62' for placing the latter in driving engagement with the driven clutch member 61. This operation takes place when the rod means 74 is moved downwardly from its rest position illustrated in FIG. 1 through only a relatively slight distance, as will be apparent from the description which follows.

The rod means 74 is moved downwardly by an operator-actuated means which includes the lever 81 (FIG. 1) pivoted at 82 to one of the legs 12. This lever 81 carries a plate 83 spaced from the side of the lever 81 by any suitable pins 84 (FIG. 7) fixed to lever 81 and having a press fit, for example, in openings of the plate 83, in the manner shown most clearly in FIG. 7. The rod 74 extends freely through the space between the plate 83 and the lever 81 and is located between the pair of pins 84. The left pin 84, as viewed in FIG. 1, is located directly over the projection 74a, as is apparent from FIG. 1, and in fact a spring 85 is connected at one end of the lever 81 and at its opposite end to the rod 74 to urge the latter to the left, as viewed in FIG. 1, so as to guarantee that the projection 74a will be located beneath a second projection formed by the left pin 84, as viewed in FIG. 1.

The operator-actuated means includes a pedal-operated valve 90 which directs air under pressure from any suitable source through the conduits 91 and 92. A supply conduit 93 which delivers the compressed air to the valve 90 is shown in FIG. 1, as well as the pedal 94 which is actuated by the operator to control the flow of air. In its rest position the two-way valve 90 will assume a position which will direct the compressed air from the supply conduit 93 along the conduit 92 into the upper end of a cylinder 95. The conduits 91 and 92 are flexible, and the cylinder 95 houses in its interior a piston which is fixed to a piston rod 96 extending upwardly from the piston to a bracket 97 carried by the underside of the base plate 11. The piston rod 96 is pivotally connected to the bracket 97, and when air under pressure enters through the conduit 92 into the upper end of cylinder 95, this cylinder is urged upwardly along the piston rod 96 so that the lower end of the cylinder 95, which is pivotally connected at 98 to the lever 81, will cause the lever 81 to turn in a counterclockwise direction, as viewed in FIG. 1, to the rest position of the operator-actuated means illustrated in FIG. 1. When the operator depresses the pedal 94, the position of the valve is changed so that the compressed air now flows out of the upper end of the cylinder 95 discharging to the atmosphere through valve 90, and at the same time compressed air flows through the pressure conduit 91 into the lower end of the cylinder 95, so that the cylinder 95 now moves down so as to turn the lever 81 in a clockwise direction from the rest position thereof shown in FIG. 1 to a lower operating position, and during this movement the left pin 84, as viewed in FIG. 1, will engage the projection 75 and will move the rod 74 sufficiently to turn the rod 71 and the shifting fork 70 through an angle which will press driving clutch member 62' against the driven clutch member 61, and thus the drive to the rolls 49 and 50 is started. Of course, this will commence the movement of the conveyor band 31 and the transportation of the continuous backing 13.

The upper shaft 52, at its end which is distant from the clutch, fixedly carries a pulley 100 (FIG. 2) which drives a belt 101, and this belt 101 also extends around a pulley 102 fixed to a shaft 40 (FIG. 6) so as to drive the shaft 40. This shaft 40 carries a gear 103 which meshes with a gear 104 carried by the shaft 39 so that in this way the drive is also transmitted to the rolls 37 and 38 which turn in a direction which transports the continuous band 13 and the strips 41 to the right, as viewed in FIG. 1.

A connecting rod 105 (FIG. 1) is pivotally connected at its bottom end to the lever 81 and at its upper end to a second lever 106 which is parallel to the lever 81 and pivotally connected to the left leg 12 of FIG. 1, so that the elements 81, 105 and 106 form a parallelogram linkage. The lever 106 is provided at its right end, as viewed in FIG. 1, with a pair of laterally extending lugs each of which is formed with an opening, and the bottom free ends of springs 107 and 108 extend through these openings, respectively, these springs having bottom enlarged ends 109 and 110, preventing the bottom ends of the springs from moving through the openings of the lugs. Thus, during the downward turning of the rod 81 the lever 106 will also turn downwardly and will pull first the spring 107 and then the spring 108. This spring 107 extends upwardly through an opening in the base plate 11 and is connected at its top end to a tilt bar 111 which is supported for turning movement on a stand 112 carried by plate 11. This tilt bar has its right end, as viewed in FIG. 1, in engagement with a leaf spring 113 which is in turn fixed to a rockable support 114 for a folding unit 115 of a well known construction. The stand 112 fixedly carries a lateral arm 116 provided with an adjustable stop 117 which limits the counterclockwise turning movement of the tilt bar 111 upon downward pulling of the spring 107 by clockwise turning of the lever 106 upon actuation by the operator of the pedal 94.

The folding unit 115 is fixed by the screws 118, for example, to the sleeves 119 (FIG. 2) which are fixed to a shaft 120 which is in turn freely turnable within a pair of sleeves 121 fixed to the top ends, respectively, of a pair of bars 122 (FIG. 1) which are fixed at their lower ends to sleeves 123 and through which a shaft 124 extends, the shaft 124 being fixed to the sleeves 123 and supported for turning movement by any suitable bearings. The shaft 124 fixedly carries a bar 125 provided at its opposite ends with stop screws which are adjustable, and the left end of the bar 125 is fixed to the spring 108, as is shown in FIG. 1.

Figure 4:
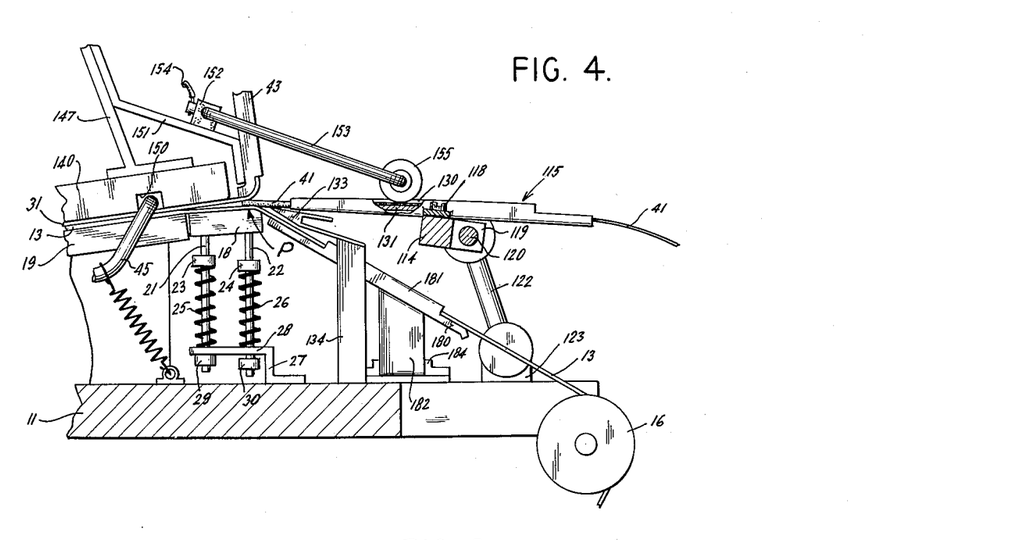
FIG. 4 is a fragmentary illustration of part of the structure of FIG. 3 shown in a position different from that of FIG. 3.

The folding unit 115 is in the form of an elongated tube having the slot 130 formed in its top wall (FIG. 2), and in its interior this folding unit 115 is provided with an electrically conductive core 131 about which the successive facings, as they are fed into the folding unit 115 by an operator, are folded in a well known manner so as to have their side edges folded under and the front end of each facing becomes located over the pointed end 132 of the core member 131, this pointed end being most clearly visible in FIG. 2. A stationary point-forming member 133 is fixedly carried by a standard 134 (FIG. 1) fixed to the top of the plate 11. When the lever 106 turns in a clockwise direction, as viewed in FIG. 1, it will first pull on the spring 107 so as to turn the tilt bar 111 in a counterclockwise direction, as viewed in FIG. 1, and thus the folding unit 115 will first be rocked upwardly so as to cause the pointed end 132 of the core 131 to cooperate with the point-forming member 133 to form a point at the leading end of the facing in a well known manner. Thereafter, the continued downward movement of the lever 106 will cause the latter to pull downwardly on the spring 108 so as to turn the bar 125 in a counterclockwise direction, as viewed in FIG. 1, within the limits determined by the left stop screw 126, and this action will thrust the folding unit 115 forwardly to the position illustrated in FIG. 4. It will be noted that in this position the leading end of the facing strip 41 is applied to the nip between the conveyor band 31 and the rigid member 18. The yieldable resilient means 21—30 enables the member 18 to move to the position illustrated to an exaggerated degree in FIG. 4, as a result of the play of the rods 21 and 22 in the openings of the wall 28 of the bracket 27, and thus injury to the backing or to the conveyor is reliably prevented. On the other hand the folded point-shaped leading end of the facing 41 is reliably nipped between the conveyor band and the backing and is transported with the latter to the left, as viewed in FIG. 4, from the rigid member 18 to the rigid member 19 with the facing 41 located between the conveyor band 31 and the backing 13. This conveyor band is pressed downwardly against the rigid members 18 and 19 by the presser iron 140, and the action of the rolls 49 and 50 moves the conveyor band 31 together with the backing and facing to the left, as viewed in FIGS. 1 and 2. However, it should be noted that it is the pressure exerted upon the facing between the conveyor band and the backing which guarantees movement of the facing until the latter is also in the nip between the pressure rolls 49 and 50.

The lever 106 is pivotally connected to the bottom end of a rod 141 which extends upwardly through opening 141' of plate 11 (FIG. 2) and slidably through a sleeve 142 (FIG. 1) which is pivotally carried by a lever 143. The lever 143 is pivotally carried by a standard 144 (FIG. 3) fixed to the plate 11 for turning movement about the pivot 145, and the front end of the lever 143 fixedly carries a block 146 to which a bracket 147 is fixed, this bracket carrying the electrical heating iron 140. When the lever 106 is turned downwardly upon actuation of the pedal 94 by the operator, it will pull downwardly on the rod 141 which will first move through a certain distance and will then act on the lever 143 to turn the latter in a clock-wise direction, as viewed in FIG. 3, and when the lever 143 is in its bottom operating position the pressing iron 140 will be located in the position indicated in FIG. 4, pressing against the lower run of the conveyor band and applying its heat through the latter to the facing and backing for participating in the reliable adhesive joining thereof, as will be apparent from the description which follows. It will be noted that the presser iron is formed with a transverse groove 150 through which the transverse arm of the tensioning rod 45 freely passes when the presser iron is in its lower pressing position illustrated most clearly in FIG. 4.

The bracket 147 carries an additional bracket 151 to which the guide 43 is fixed, and in addition the bracket 151 carries an insulating block 152 of electrical insulating material to which an arm 153 of a feeler or sensing means is fixed, this arm 153 being in electrical connection with an electrical lead 154. The feeler rod 153 turnably carries at its right end, viewed in FIG. 3, an electrically conductive feeler roller 155 which is electrically connected with the rod 153 as well as through the rod 153 to the lead 154.

A spring 156 (FIG. 1) is coiled around the upper free end portion of the rod 141 which extends beyond sleeve 142, and a collar 157 is fixed to the upper end of the rod 141 to cooperate with the spring 156 at the top end of the latter, the lower end of the spring bearing against the sleeve 142. Thus, during the initial part of the downward movement of the lever 106 the spring 156 will be compressed, and then at a certain point in the compression of the spring, which can be determined by the location of the collar 157 on the rod 141, the lever 143 will be turned downwardly from its rest position to its operating position to locate the presser iron 140 in the position illustrated in FIG. 4. This downward movement of the lever 143 will also locate the feeler roller 155 in a position extending through the slot 130 in the upper wall of the folding unit 115, and the facing 41 itself will prevent engagement of the electrically conductive feeler roller 155 with the electrically conductive core 131. However, it is apparent when the trailing end of the facing 41 moves beyond the roller 155, this roller, which is urged downwardly by the springiness of the feeler rod 153, will suddenly come into engagement with the electrically conductive core 131 for a purpose described below.

During its upward movement toward the guide roll 16, the continuous backing 13 has adhesive applied thereto by an adhesive applying means according to the present invention, as shown most clearly in FIGS. 3 and 5. This adhesive applying means includes an adhesive reservoir 160 provided with any suitably liquid adhesive through a conduit 161 which is fed with the adhesive by gravity from a tank located at a suitable elevation to assure the gravity flow. The adhesive flows through the conduit 161 into the reservoir 160 through an opening 162 capable of being closed by a valve 163 which is fixed to a valve stem 164 extending fluid-tightly through the left end wall of the reservoir 160, as viewed in FIG. 5. A rod 166 is provided at its left end, as viewed in FIG. 5, with a lateral extension 167 formed with an opening through which the valve stem 164 freely passes, and a pair of collars 168 are connected to the valve stem 164 on opposite sides of the extension 167. The rod 166 has an upwardly directed projection 169, and at its right end, as viewed in FIG. 5, the rod 166 is pivotally connected to a manually turnable lever 170 which is pivotally supported at 171 on the reservoir. A bracket 172 is carried by the reservoir and this bracket pivotally supports a bell crank 173 one end of which is engaged by the projection 169. The other end of the bell crank 173 engages a collar 174 fixed on a rod 175 which is freely slidable through an opening in the bracket 172, and this rod carries a cover 176. Bracket 172 supports rod 175 for axial movement. A coil spring 177 is coiled about the rod 175, bears at one end against the bracket 172 and at its opposite end against a collar 178 adjustably fixed on rod 175 so as to urge the cover 176 toward the reservoir 160. This reservoir is provided with an outlet 177' which is removably connected to the remainder of the reservoir through any suitable structure such at the nuts 178' threaded on the studs 179 fixed to the reservoir and extending through openings in the removable outlet 177'. The cross-sectional area of the outlet 177' is such that it substantially extends across the width of the backing 13, and therefore the adhesive will reliably cover the backing through substantially its entire width. The thickness of the layer of adhesive is determined by the force of spring 177, this force being controlled by the position of collar 178. It will be noted that the backing extends between the outlet 177' and the cover 176 which is urged by the spring 177 toward the outlet 177', so that during pulling of the backing adhesive is reliably applied thereto at the face of the backing strip which is directed away from the cover 176 and which is directed upwardly when the backing strip engages the rigid members 18 and 19 so that the facing 41 will engage the surface of the backing 13 to which adhesive has been applied. The reservoir 160 is mounted on the supporting frame 10 through any suitable bracket. The outlet 177' forms a unit with the guide 15, so that when backings of different widths are used the outlet 177' may be exchanged for another outlet of different dimensions conforming to the width of the new backing, and with this outlet a guide 15 of a different width conforming to the width of the backing will be provided. The cover 176 is made sufficiently large so that it will conform to the several outlets of the different sizes.

As may be seen in FIG. 5, the spring 177 in urging the cover 176 toward the outlet 177' also urges the collar 174 against the bell crank 173 so as to turn the latter in a clockwise direction, as viewed in FIG. 5, and thus urges the bar 166 to the left so as to maintain the valve stem 164 and the valve 163 in the axial position illustrated in FIG. 5 where the opening 162 is unobstructed so that the adhesive can flow by gravity into the reservoir 160 and the adhesive is automatically applied during movement of the backing 13. When it is desired to stop the flow of adhesive for any reason, the operator simply turns the lever 170 in a clockwise direction, as viewed in FIG. 5, and this will advance the valve 163 to the right, as viewed in FIG. 5, into a position closing the opening 162 and thus stopping the flow of the adhesive. It will be noted that simultaneously the projection 169 acts on the bell crank 173 to turn the latter in a direction which will move the cover 176 through a very slight distance from the outlet 177 so that this movement of the lever 170 is used when threading the backing initially through the machine. Once it is threaded, the trailing end of one backing is fixed to the leading end of the next backing before this trailing end reaches the adhesive applying means, so that there is no interruption where the cover 176 can engage the outlet to have adhesive applied to the cover and thus undesirably applied to the wrong face of the backing. Of course, when the backing strip is initially threaded through there is no adhesive in the outlet. Because the adhesive is spread almost all the way across the backing, reliable joining of the folded point end of the facing to the backing is assured.

The details of the guide 17 are shown most clearly in FIG. 8. The guide 17 includes the upwardly inclined guiding member 180 which has at its left side, as viewed in FIG. 8, a flange 181 which cooperates with the side edge of the backing 13 to guide the latter. The guiding member 180 is fixedly carried by a substantially L-shaped bracket 182 which has at its bottom end a leg 183 slidable beneath a strap 184 which is fixed to a bracket 185 of which in turn fixed to the base plate 11. This bracket 185 has an upstanding wall formed with an opening through which a screw 186 extends and this screw has a knurled head 187 and also carries collars 188 engaging opposite sides of the wall 185 so as to prevent axial movement of the screw 186. The threaded portion of the screw 186 extends through a threaded bore formed in the wall 182, so that by turning the screw 187 the lateral position of the guiding member 180 can be determined, and thus it is possible to determine the location of the side flange 181. This guide member 180 in turn carries a second guiding member 190 which is provided with a side flange 191 cooperating with the other side of the backing 13, and a screw 192 extends through an elongated slot 193 in the second guide member 190 so that the second guide member 190 can be shifted laterally on the guide member 180 so as to also have its side flange 191 accommodated to the side edge of a particular backing. Thus, with this arrangement where the guide member 180 is independently adjustable laterally and the guide member 190 is adjustable on the guide member 180, it is possible to have the center line of one backing coincide with the center line of a backing of a different width while still accommodating the guides to the backing strips of different widths.

The control structure of the invention includes, in addition to the feeler roller 155 which forms part of a sensing means and the electrically conductive core member 131 of the folding unit 115, the electrical structure illustrated most clearly in FIG. 7. This structure is carried directly by the lever 81 and is suitably insulated therefrom. Thus the structure includes a solenoid 200 whose armature shifts to the left as viewed in FIG. 7, when the solenoid 200 is energized. A rod moving member 201 is pivotally carried by lever 81. The armature of the solenoid is connected by a suitable linkage to the rod moving lever 201, which, when it turns in a clockwise direction, as shown by the arrow in FIG. 7, engages the projection 74a of the rod means 74 to turn the rod means 74 to the right, as viewed in FIG. 1, in opposition to the spring 85 so as to locate the projection 74a out of the path of the projection formed by the left pin 84 of FIG. 1, and thus the clutch means is free to automatically move to its disengaged position. In this way the transmission of the drive from the motor 67 to the transporting means is automatically terminated irrespective of how long the operator maintains the pedal 94 depressed so as to maintain the lever 81 in its lower operating position. As is apparent from FIG. 7, a spring 202 maintains the armature and the rod moving lever 201 in the rest positions thereof illustrated in FIG. 7. As is apparent from FIG. 7, the electrical circuit includes the transformer 203 connected to the lines and capable of being energized by manual closing of the switch 204 which may also serve to energize the motor 67 which runs continuously. The core 131 of the folding unit is shown diagrammatically in FIG. 7 and is indicated as grounded, and the same is true of one end of the coil of the solenoid 200. The other end of the coil is connected through the secondary winding of the transformer to the lead which extends to the springy feeler arm 153 which carries the feeler roller 155. Thus, when the trailing end 156 of the facing 41 moves to the left, as viewed in FIG. 7, beyond the feeler roll 155, this feeler roll will engage the core 131 to complete the circuit through the solenoid 200 so as to energize the latter and thus cause the rod moving lever 201 to move the rod 74 to the right, as viewed in FIG. 1 to automatically disengage the clutch and thus stop the transportation of the backing and facing.

It should be noted that it is not desirable to stop the transportation immediately after the trailing end of the facing 41 moves beyond the feeler roll 155, since the facing 41 is still in the folding unit 115 at this time. Therefore, the action of the solenoid is delayed, in accordance with the present invention, and this is done by a delay means formed by the dash-pot structure 210 which is also connected to the armature of the solenoid 200. When the armature moves to the left, as viewed in FIG. 7, it will urge the piston of the dash-pot in the cylinder thereof to the left, and the dash-pot has a suitable adjustable vent 211 which can be regulated by a valve carried thereby so as to allow the air in the dash-pot to escape precisely at a rate which will cause the energized solenoid to move the lever 201 through an angle sufficient to displace the projection 74a beyond the projection formed by the left pin 84 only when the trailing end of the facing 41 has moved slightly beyond the point P indicated in FIG. 4, at which the leading end of the facing was applied by the forward thrust of the folding unit 115 to the path of movement of the backing strip. Thus, the structure can be regulated by the adjustment of the vent 211 so as to accurately stop the transportation precisely when the trailing end of the facing is located slightly to the left beyond the point P indicated in FIG. 4, and in this way when the next facing is applied it will have its leading end located closely adjacent to the trailing end of the immediately preceding facing. In this way the facings 41 will have the positions indicated at the upper portion of FIG. 1 where they are closely adjacent to each other so as to provide a minimum amount of backing waste.

After the transportation of the backing and the facing which has been applied thereto has been terminated automatically in the manner described above, the operator can release the pedal 94 so that the parts will return to their rest position indicated in FIG. 1. The automatic control structure which automatically stops the transportation of the backing relieves the operator of the requirement of quickly stopping the operation precisely at a moment when the trailing end of the facing is located in a predetermined location. Thus, the operator need pay no attention to the particular location of the facing, and all the operator need do is make sure that the pedal 94 is released shortly after the movement of the conveyor band 31 stops. Stopping of this movement is immediately noticeable so that directly thereafter the operator can without any difficulty release the pedal 94 so that all the parts return to the position indicated in FIG. 1. Then the operator inserts the next facing into the folding unit, and the slot 131 is available at this time to the fingers of the operator to aid in the advancing of the facing through the folding unit 115. Once the front end of the facing is located over the front end of the core 131, the operator can again depress the pedal 94 so that all of the above operations will take place. The structure is so designed that the folding unit 115 will first thrust forwardly through the position indicated in dot-dash-lines in FIG. 3 to the position indicated in FIG. 4 locating the front end of the facing strip 41 at the desired point along the path of movement of the backing, and the block 18 can yield slightly at this time, as described above. Directly thereafter the lever 143 moves down to the operating position placing the iron 140 and the conveyor band 131 in the position shown in FIG. 4, and simultaneously with this movement of the lever 143 the clutch becomes engaged so as to start transportation. It will be noted that when the transportation starts the leading end of the facing will already be nipped between the backing and the conveyor band 31.

The backing 13 with facings 41 joined thereto moves off to the right beyond rolls 37 and 38, as viewed in FIG. 1, and may be wound onto any spool or collected in a suitable bin.

A latitude of modification, change and substitution is intended in the foregoing disclosure and in some instances some features of the invention will be employed without a corresponding use of other features. Accordingly, it is appropriate that the appended claims be construed broadly and in a manner consistent wtih the spirit and scope of the invention herein.

What I claim is:

1. In a machine for joining a series of belt facings to a continuous belt backing, in combination, first and second elongated substantially rigid members arranged along a path along which a continuous backing moves, said second member being located after asid first member in the direction of movement of the backing, resilient means yieldably supporting said first member at said path and opposing movement thereof away from said path, a single endless conveyor band cooperating with said members for sliding along the latter a backing nipped between said members and said conveyor band, and means for applying to the nip between said conveyor band and first member an end of a facing, so that the latter will be transported together with and applied to the backing, said first member yieldably moving in opposition to said resilient means away from said path when said end of the facing is applied to the backing in the nip between said first member and conveyor band.

2. In a machine for joining a series of belt facings to a continuous belt backing, in combination, a single endless conveyor band encompassing a given space, an elongated substantially rigid member along which the band moves so that a backing nipped between said rigid member and band will be transported by the latter along said rigid member, a presser iron located in said space, means cooperating with said iron to move the later between an operating position, parallel and adjacent to said rigid member and pressing said band toward said rigid member for applying heat to a backing nipped between said conveyor band and rigid member, and an inoperative position spaced from said rigid member and the portion of the band engaging said rigid member, and band guiding and tensioning means cooperating with said endless band for maintaining the latter out of engagement with said iron while the latter is in its inoperative position.

3. In a machine for joining to a continuous backing a series of belt facings, in combination, elongated substantially rigid means having a surface along which the continuous backing is adapted to slide during movement of the backing along a given path, said surface of said elongated rigid means having an entrance portion which is first engaged by the backing during movement of the latter, a single endless conveyor band moving along the elongated rigid means at said surface thereof for transporting a backing nipped between the endless band and said rigid means, and band guiding means movable from a rest position where said band guiding means spaces the band from said entrance portion of said surface to an operating position where said band guiding means places said band next to said entrance portion of said surface, so that while said band guiding means is in said rest position thereof an end of a belt facing can be applied to the backing at a part of the latter engaging said entrance portion of said surface and when the band guiding means thereafter moves to its operating position said end of the facing will be nipped between the band and rigid means to be transported together with and applied to the backing.

4. In a machine for applying a series of belt facings to a continuous backing, in combination, an adhesive reservoir having an outlet through which adhesive is adapted to flow, a cover covering said outlet, urging means yieldably urging said cover toward said outlet, transporting means cooperating with a backing for transporting the latter along a path extending between said cover and outlet so that the cover presses the backing against the outlet, whereby the adhesive is applied to the backing as it moves past said outlet.

5. In a machine for joining a series of belt facings to a continuous belt backing, in combination, an adhesive reservoir having an outlet removably connected to the remainder of said reservoir, a cover located adjacent said outlet for covering the latter, urging means cooperating with said cover for urging the latter toward said outlet, and transporting means acting on a backing strip for moving the latter along a path extending between said cover and outlet so that said cover presses said backing toward said outlet and adhesive at the outlet is applied to said backing during movement thereof past said outlet, said outlet applying adhesive across substantially the entire width of said backing and a backing guide rigidly connected to and forming a unit with said outlet so that said guide and outlet are removable as a unit, the width of the guide corresponding to the width of the outlet.

6. In a machine for joining a series of belt facings to a continuous belt backing, in combination, transporting means for transporting the backing including a continuous conveyor, drive means, clutch means cooperating with said drive means and transporting means for transmitting a drive from said drive means to said transporting means when said clutch means is in an engaged position and for cutting off the drive from the drive means to the transporting means when the clutch means is in a disengaged position, said clutch means automatically assuming said disengaged position except when positively held in said engaged position, operator-actuated means movable from a rest position to an operating position by the operator, linkage means cooperating with said operator-actuated means and said clutch means for transmitting movement of the operator-actuated means to said clutch means to place and positively hold the latter in said engaged position thereof when the operator-actuated means is placed in its operating position, and control means cooperating with said linkage means for placing the latter out of operative cooperation with said operator-actuated means at a preselected, automatically determined moment so that said clutch means will then be free to assume its disengaged position even though the operator-actuated means remains in its operating position.

7. In a machine for joining a plurality of facings to a continuous backing, in combination, transporting means including a continuous conveyor for transporting a facing and backing along a given path while joining the facing to the backing, sensing means sensing the movement of said facing and sensing when a trailing end thereof has moved beyond a given location, drive means, clutch means automatically assuming a disengaged position and having an engaged position transmitting a drive from said drive means to said transporting means, operator-actuated means movable from a rest position to an operating position by the operator, linkage means operatively connected with said operator-actuated means and said clutch means for transmitting movement of said operator-actuated means to said clutch means for placing the latter in its engaged position when the operator places said operator-actuated means in said operating position thereof, and control means automatically actuated by said sensing means when the latter senses the movement of the trailing end of the facing beyond said location for automatically placing said linkage means out of operative cooperation with said operator-actuated means so that the clutch means will return to its disengaged position and stop the transmission of the drive to the transporting means when the trailing end of the facing has moved beyond said given location even though the operator-actuated means is still in its operating position.

8. In a machine for joining a series of belt facings to a continuous backing, in combination, elongated rod means movable longitudinally between a pair of positions which determine whether or not a transporting means operates to transport backing, said positions of the rod means respectively being a rest position where the transporting means does not operate and an operating position where the transporting means operates, and said rod means having a first projection, operator-actuated means movable by the operator from a rest position to an operating position and including a second projection movable along a path intersected by said first projection, movement of said operator-actuated means to its operating position placing the second projection in engagement with said first projection and moving the rod means from its rest to its operating position so as to start the operation of the transporting means, urging means cooperating with said rod means for urging the latter from its operating to its rest position and said rod means being held in its operating position by the cooperation of said projections in opposition to said urging means, moving means located adjacent the rod means for moving the latter in a direction which will locate said first projection out of the path of movement of said second projection to release said rod means to said urging means to be returned thereby to said rest position even though the operator-actuated means remains in its operating position, and sensing means sensing the movement of a facing to a predetermined location and cooperating with said moving means for automatically actuating the latter to move said first projection out of the path of movement of the second projection when the facing reaches said predetermined location.

9. In a machine for joining a series of belt facings to a continuous belt backing, in combination, elongated rod means longitudinally movable between a pair of positions one of which is a rest position at which a transporting means which transports the strips is inoperative and the other of which is an operating position at which said transporting means is operative, said rod means having a first projection, operator-actuated means movable by the operator from a rest to an operating position and including a second projection movable along a path intersected by said first projection and said second projection engaging said first projection for moving the rod means from its rest to its operating position during movement of said operator-actuated means to its operating position, urging means cooperating with the rod means for urging the latter from its operating to its rest position, a rod moving member movably carried by said operator actuated means adjacent to said rod means and movably through a stroke engaging the rod means and moving the same in a direction which places the first projection out of engagement with the second projection so that the rod means can return to its rest position, a solenoid cooperating with said rod moving member for moving the latter through said stroke when said solenoid is energized, an electrically conductive member along which a facing moves while transported by said transporting means, an electrically conductive feeler engaging the facing to be insulated thereby from the electrically conductive member until a trailing end of the facing is beyond said feeler, and an electrical circuit interconnecting the feeler, electrically conductive member, and solenoid for energizing the latter when the feeler engages the electrically conductive member so that the rod moving member will be moved through its stroke when the facing has moved to a given location.

10. In a machine for joining a series of belt facings to a continuous belt backing, in combination, feeler means for sensing when a belt facing has moved at a trailing end thereof beyond a given point, transporting means for transporting the facing, stopping means actuated by the feeler means for stopping the operation of the transporting means when the trailing end of the facing has moved beyond said point, and delay means cooperating with said stopping means for delaying the stopping of the transporting means until the trailing end of the facing strip has moved a predetermined distance beyond the feeler means.

11. In a machine for joining a series of belt facings to a continuous belt backing, in combination, transporting means for transporting a continuous backing and a facing along a given path, drive means, clutch means cooperating with the drive means and transporting means for transmitting the drive from the drive means to the transporting means when the clutch means is in an engaged position, said clutch means automatically assuming a disengaged position, linkage means cooperating with the clutch means for moving the latter to its engaged position, said linkage means including an elongated rod having a projection, operator-actuated means cooperating with the projection of said rod for acting on the latter to move the linkage means in a direction which places the clutch means in its engaged position, solenoid-operated means cooperating with the rod for moving the projection of the latter out of operative cooperation with the operator-actuated means to release the clutch means for movement back to its disengaged position and thus stop the operation of the transporting means, sensing means sensing the movement of a facing to a given location and cooperating with the solenoid-operated means for automatically actuating the latter when the facing has reached said given location, and dash-pot means cooperating with said solenoid-operated means for retarding the operation of the latter so as to delay moving of the rod projection out of operative association with the operator-actuated means until the facing has been moved by the transporting means through a predetermined distance beyond said given location.

12. In a machine for joining a series of belt facings to a continuous belt backing, in combination, an electrically conductive core of a folding unit which folds at least the side edges of a belt facing, an electrically conductive member engaging a facing which moves along said core until a trailing end of the facing moves beyond said member, and means cooperating with the member to place the latter in engagement with the core when the trailing end of the facing strip moves beyond the member so as to place the member and core in electrical communciation with each other.

13. In a machine for joining a series of belt facings to a continuous belt backing, in combination, an elongated facing folding unit having an inner electrically conductive core along which a facing moves and an upper wall formed with an elongated slot, support means, a lever carried by said support means for movement from an upper inoperative to a lower operative position, a presser iron carried by said lever and located in a pressing position when said lever is in its lower operating position, and feeler means carried by said presser iron and having a sensing end portion extending through said slot and urged into engagement with said core when said lever is in its lower operating position, the facing itself during movement along said core insulating the sensing end portion of said feeler means from the core so that the feeler means and core are placed in electrical communication with each other when the trailing end of the facing moves beyond the sensing end portion of the feeler means.

References Cited in the file of this patent

UNITED STATES PATENTS

| | | |
|---|---|---|
| 2,068,183 | Kay | Jan. 19, 1937 |
| 2,429,004 | Wachsman | Oct. 14, 1947 |
| 2,433,444 | Eichinger | Dec. 30, 1947 |
| 2,497,017 | Shann | Feb. 7, 1950 |
| 2,635,670 | Winberg | Apr. 21, 1953 |